Dec. 31, 1957  A. DOLENC  2,818,515
STATORS FOR ELECTRICAL MACHINES
Filed Oct. 12, 1954  3 Sheets-Sheet 1

Inventor:
Anton DOLENC

Dec. 31, 1957 A. DOLENC 2,818,515
STATORS FOR ELECTRICAL MACHINES
Filed Oct. 12, 1954 3 Sheets-Sheet 2
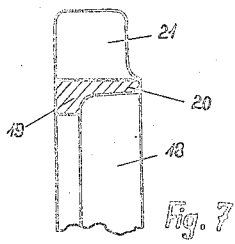
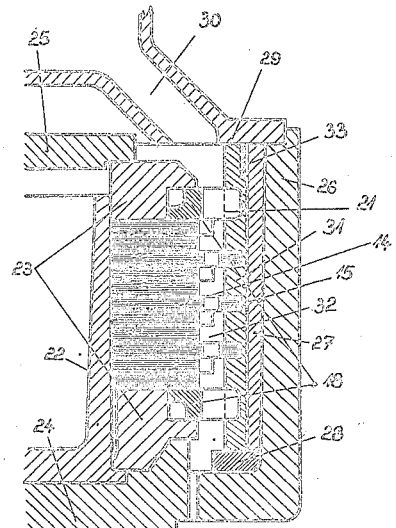
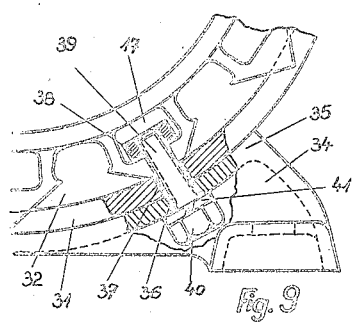
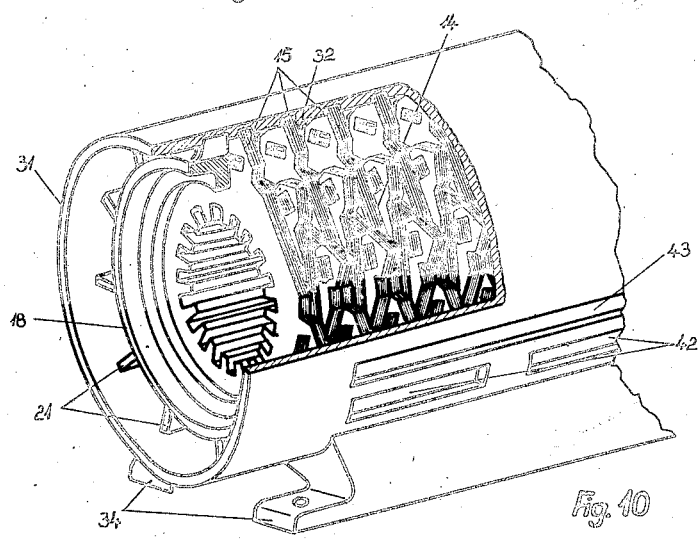
Inventor:
Anton DOLENC
Attorney Dec. 31, 1957   A. DOLENC   2,818,515
STATORS FOR ELECTRICAL MACHINES
Filed Oct. 12, 1954   3 Sheets-Sheet 3

Inventor:
Anton DOLENC
Attorney

United States Patent Office 2,818,515
Patented Dec. 31, 1957

2,818,515

STATORS FOR ELECTRICAL MACHINES

Anton Dolenc, Zagreb, Yugoslavia, assignor to "Rade Koncar" tvornica elektricnih strojeva, Zagreb, Yugoslavia, a company of Yugoslavia Application October 12, 1954, Serial No. 461,890

10 Claims. (Cl. 310—57)

The present practice in the manufacture of stators of rotating electrical machines consists in taking the individually stamped stator laminations, which are usually of circular form externally and which are provided internally with the usual slots, and assembling these laminations into stacks by pressing them together and incorporating them into a separately cast or welded stator housing. In this mode of construction only the external cylindrical surface of the stack of plates comes into effect for the cooling of the stator laminations. Only in a few rarely used constructions the individual stator laminations possess projections of various shapes which lie internally against the stator housing and which form between themselves air spaces whereby the coiled surface of the stack of laminations is increased, but only to a small degree.

The present invention relates to a stator for rotating electrical machines wherein the stack of laminations is composed of angularly staggered stator laminae or stator packets, and in which the periphery of the stator plates is provided, preferably at the corner portions which otherwise go to waste in stamping, with similarly formed or variously formed teeth, grooves or projections, which latter may if necessary be provided with perforations. The stack of laminations thus formed will exhibit over its entire perimeter, by virtue of the said teeth or projections and by virtue of the angularly staggered arrangement of the plates or of the packets of plates, a series of regularly staggered radial extensions. By virtue of these radial extensions the effective superficial area of the stack available for cooling is appreciably increased. The cooling effect is also enhanced by the eddying of the air at the staggered extensions referred to. Consequently when adopting this construction the axial cooling channels, which are otherwise adopted in the known practice, may be omitted because, in consequence of the increased effective cooling surface a sufficient cooling of the individual stator plates or of the stator packets is ensured by radial heat conduction. Moreover the angularly staggered arrangement of these extensions on the individual stator plates, or of the packets of plates which together form the entire stack, increase the effective ideal magnetic diameter of the stator stack, which, in accordance with the known proportionality law, results in an increase of the output in proportion to the third power of the diameter.

Furthermore, a stator stack constructed as above described makes possible a simple and convenient construction of the stator housing and of the securing of the stator stack to the stator housing. Thus, the stator stack compressed between two respective end pressure rings may be cast round with a centrifugally cast mass, for example of aluminum, in such a manner that a cylindrical jacket is formed round the stator stack, and the individual projecting ends of the staggered radial extensions or the like lie embedded in the said cast jacket, so that the stator stack forms with the stator housing a massive unit. In such a manner there is formed between the cast jacket and the stator stack a network of numerous sub-divided and staggered cooling channels. The cast jacket is preferably provided with oblong openings which give access to and make possible the cleaning of the cooling channels which are formed between the stator stack and the surrounding jacket and these openings may be kept covered normally with metal plates. If a suitably formed stator housing is laid in the centrifugal mould, the stator stack is then combined with the stator housing by means of the centrifugally cast mass. Similarly a steel plate cylinder can be inserted in the centrifugal mould whereby a stator is obtained whose aluminum jacket is reinforced with steel plate. This method of construction is advantageous in the case where centrifugal casting masses of low strength are used for example such as aluminum because the said construction allows the low strength casting to be relieved of the higher mechanical stresses, in that the feet, the lifting eyes and the terminal boxes, and so on, of the machine may be anchored directly to the stator stack and in that the centering rims for the end bearing shields may be turned on a lathe or otherwise formed in the end pressure rings.

The pressure rings for the stator stack are preferably provided with teeth directed radially outward, the points of which are likewise cast into the cast jacket.

In the case of smaller motors, the stator plates need not be externally grooved but may be assembled in angularly staggered manner as a polygon and incorporated directly into the cast mass, whereby an increase in the ideal magnetic diameter is obtained and also an effective heat conduction with a strong cooling effect is achieved by the increased area of contact provided between the external surface of the stator stack and the cast jacket.

The stator stack may also be reinforced intermediately between the pressure rings by means of rods or profile irons which are anchored in the grooves or slots of the stack provided by the cavities, cut-outs or holes of the individual stator plates comprised in the angularly staggered component plates or packets of plates forming the stack. Thereby a strong stator skeleton is formed by the cage-like structure of parts around the stator stack, and this skeleton may if necessary be sheathed with a metal skin for the guiding of the cooling air and may be provided with feet, lugs, lifting eyes, terminal boxes and so on.

By the described construction of the individual stator plates and the assembly of similar plates into stator packets and the assembly of these stator packets or plates in angular staggered formation to form the stator stack, as well as by the construction of the stator housing made possible thereby, the production of electrical machines is considerably simplified and cheapened. Moreover the cooling of the stator stack is directly improved and that of the stator windings is indirectly improved.

Constructional examples of the individual stator plates and of the packets of stator plates and of the stator stacks consisting of such plates or packets and of the construction of the stator housing according to the present invention will now be described with reference to the accompanying drawings, wherein:

Fig. 8 is a device for the centrifugal casting of an aluminum jacket about the stack;

Fig. 9 shows in cross-section the fixing of the stator feet;

Fig. 10 is a perspective view of a stator with the stator jacket partially cut away;

Figure 1:
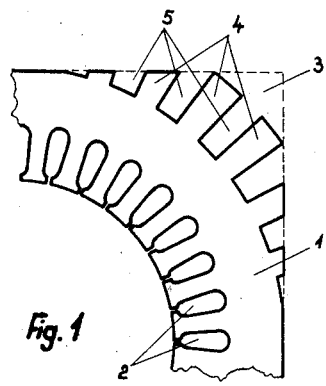
Figs. 1–4 represent parts of several different forms of the stator plates.

The stator plate 1 according to Fig. 1 is provided internally with the usual slots 2, whilst the corner portion 3 of the rectangular plate, which is usually wasted in stamping is instead provided with suitably formed teeth 4 with intervening grooves 5. These teeth and grooves can conveniently be provided at the same time as the slots 2 in the stamping operation with a normal stamping machine.

Figure 2:
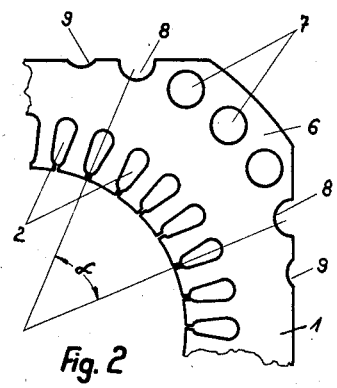

The stator plate according to Fig. 2 is shown with a shoulder 6 in which are stamped holes 7, these being formed at the same time as the slots 2. Owing to the regular angular pitch of these holes, there are formed deep cavities or cut-outs 8 and shallower cut-outs 9 which are incomplete holes, and an angle ($\alpha$) is formed between the two deeper cut-outs 8 lying on each side of the shoulder 6.

Figure 3:
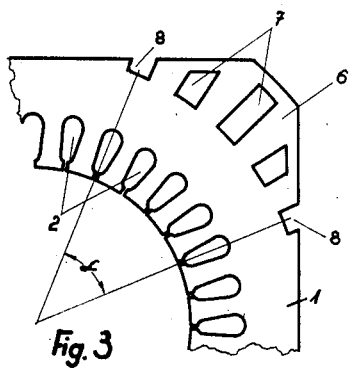

The stator plate according to Fig. 3 is formed in a very similar manner to that of Fig. 2 in that the shoulders 6 also contain holes 7 and adjoining these holes are cut-outs 8. Between the corresponding cut-outs is subtended an angle ($\alpha$). These corner pieces, or the entire stator plate, can be stamped in one cutting operation.

Figure 4:
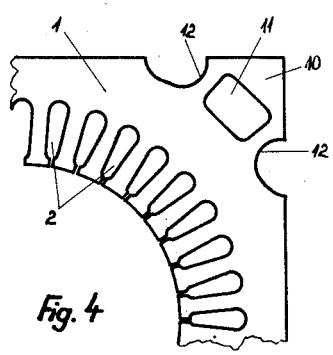
Figure 5:
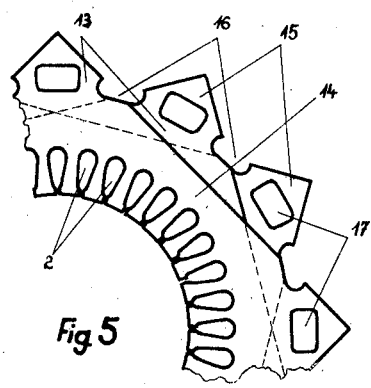
Fig. 5 represents part of a stator stack composed of angularly staggered packets of laminations each of the kind shown in Fig. 4.

A further constructional form of the stator plate is shown in Fig. 4 in which almost the entire available area of the quadrangular plate is used. The stator plate has the usual internal slots 2 and at each corner there is provided a pointed lug 10 with an internal oblong hole 11 and cut-outs 12 are provided pointing in the same direction as the slots. If these stator plates 1 are assembled as shown in Fig. 5 so as to form packets of plates 13 and these packets 13 are arranged in angularly staggered formation at regular intervals, of say 30°, there is obtained a stator stack 14 whose periphery countains twelve rows of axially aligned and radially directed crests 15, which are formed by virtue of the staggered projections 10 of the individual stator plates 1, and between which crests are formed the open channels 16 and the interrupted closed channels 17.

Figure 6:
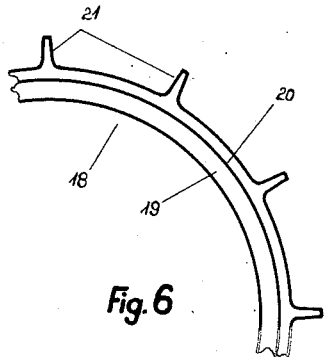
Fig. 6 is an elevation and Fig. 7 a partial cross-section of a pressure ring for this stator packet.

Such a stator stack 14 is preferably assembled between two end pressure rings of the kind shown in Figs. 6 and 7 and is provided with an aluminum jacket by a centrifugal casting process. Each of these pressure rings 18 consists of an annular portion 19 which lies against the stator stack and a crown portion 20 directed normal thereto, the said crown portion having outward radial teeth 21 of suitable form. The number of these teeth 21 preferably corresponds to the number of crest portions 15 on the stator stack formed by the shoulders 10 of the individual stator plates 1 in the angularly staggered stator packets 13 (Fig. 5).

The complete stator stack 14, together with the pressure rings 18 arranged on each side thereof, is provided with an aluminum jacket by means of a centrifugal casting process, whereby for example the device according to Fig. 8 may be employed. As shown, a stator stack lying between the pressure rings 18 and internally against the hollow core 22 is compressed between two annular jaws 23 which lie respectively against the base portion 24 and the pressure plate 25. The cylindrical exterior member 26 receives therein the cylinder 27 whose lower exterior portion is suitably tapered, and which rests below on the intermediary ring 28 and above against the member 29 forming one side of the supply channel 30. The stator jacket is then centrifugally cast in aluminum. The stator, together with the cast aluminum jacket, is lifted out of the casting device together with the conical cylinder 27 and is thereafter released from the latter. Preferably only the outermost portions of the crests 15 (Fig. 5), that is to say the points of the extensions 10 of the individual stator plates 1, and the ends of the teeth 21 of the pressure rings are cast into the jacket, since in this manner there are formed between the aluminum jacket 31 and the stator stack 14 the cooling channels 32, which are interrupted at the respective staggered crests on the stack surface, these being visible also in Figs. 9 and 10.

If a cylinder of steel plate 33 is arranged on the inside of the conical cylinder 27 as shown in Fig. 8, or if a cylinder of steel plate is included in the mould in place of the conical cylinder 27, there is obtained by the centrifugal casting process an aluminum housing having an external jacket of steel plate.

The feet of the stator are secured to the aluminum jacketed stator stack 14 preferably as shown in Fig. 9. The cast feet 34 have a concave portion 35 lying against the cylindrically formed stator jacket 31 and this concave portion is provided with a bore 36. Co-axial with this bore is a bore 37 at the same diameter through the jacket of the stator. In the interrupted axial channel 17 which is formed by the holes 11 of the individual stator plates 1 of Fig. 4, there is arranged a nut 38 into which the bolt 39 is screwed after placing a locking washer 41 under the head 40. The finished stator with the partly cut away jacket 31 is represented in Fig. 10. The annular centering surfaces for the end bearing shields can be formed on the aluminum jacket 31 or on the pressure rings 18 and this is preferable if the latter consist of iron. In this manner there is obtained a rigid connection between the stator stack 14 and the bearing shields, which are not shown in the drawing.

By specially forming the cylinder 27 (Fig. 8) there may be formed during the casting of the stator jacket 31 suitable axially disposed interrupted openings 42 or continuous openings 43. These openings make possible an easy cleaning of the intervening space between the cast jacket 31 and the stator stack 14 and are preferably normally covered with metal plates.

Figure 11:
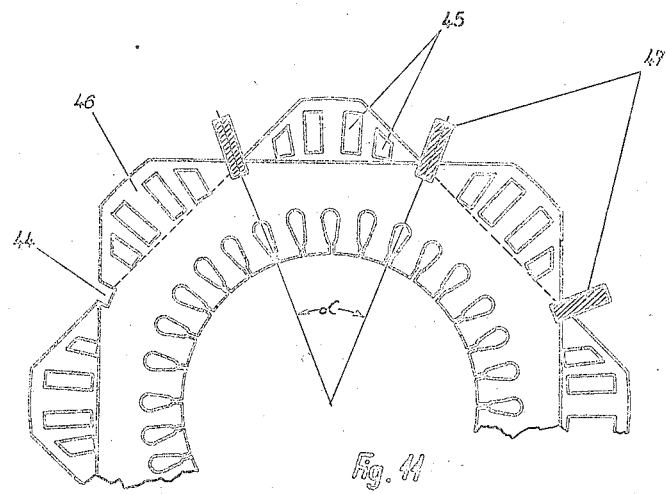
Fig. 11 shows an elevation of a part of a stator stack made of plates according to Fig. 3.

Fig. 11 represents a stator stack consisting of individual packets of plates similar to the plates 1 shown in Fig. 3 each staggered by an angle ($\alpha$). On the surface of the stator stack 14, grooves 44 are formed due to the coincidence of the individual deeper cut-outs 8 of the stator plates 1. Moreover the holes 7 in the individual stator plates 1, or in the staggered packets of plates result in the formation of variously shaped interrupted channels 45. The shoulders 6 of the individual stator plates likewise form in the assembled packets of plates similarly staggered crest portions 46. The grooves 44 above described may receive axially directed rectangular bars 47 which form a part of the stator housing.

Figure 12:
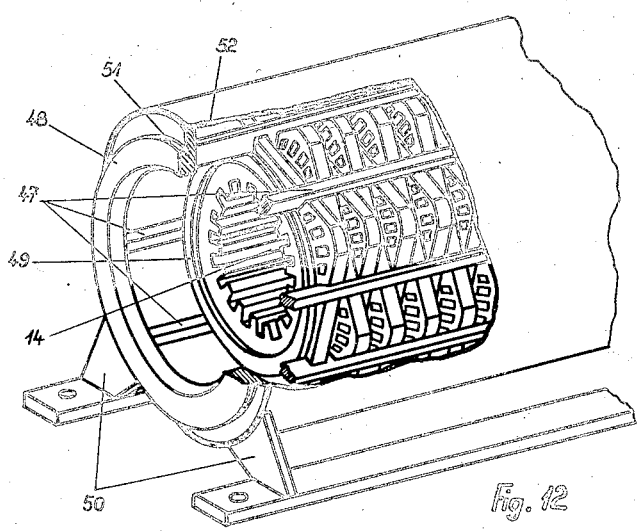
Fig. 12 is a perspective view of a machine with a stator stack assembled according to Fig. 11 and secured between two flange rings by means of ribs.

The stator housing consists in this case according to Fig. 12 of two flange rings 48, one at either side of the stator stack 14, these flange rings being connected by means of the longitudinal ribs 47 lying in the grooves 44 (Fig. 11) of the stator stack. The end pressure rings 49 are also welded to these ribs 47, and the pressure rings compress the stator stack 14 at each side thereof. The stator feet 50 are preferably welded to the flange rings 48. These flange rings also carry the bearing shields which are not shown in the drawing these being fitted to centering rims 51 which are turned in the said flange rings. The stator housing which then takes the form of a cage-like welded skeleton may then be left open as shown with the stator stack 14 exposed or, preferably, it may be enclosed by a removable cylindrical jacket 52.

This invention is not limited only to the described examples but there are to be included in the scope of the invention in the sense indicated all other possible constructions of the individual stator plates and their assembly to form packets of stator plates, as also of the assembly of the said packets to form the stator stack and the combination of the latter with the stator housing.

I claim:

1. A stator for electrical machines of the rotor-stator type, comprising a plurality of substantially square metallic laminae assembled in face to face relation and angularly staggered with respect to one another to form a stack having a plurality of crests constituted by the corners of said laminae and extending longitudinally of said stack and spaced from one another substantially peripherally of said stack, said corners of said laminae being perforated to form a plurality of longitudinal cooling ducts extending through said crests, respectively, a pair of steel pressure rings contacting the remote faces of the outermost laminae of said stack for holding all said laminae together, each of said pressure rings being provided with a plurality of radial, outwardly extending teeth equal in number to said crests of said stack and spaced peripherally of the respective pressure ring in alignment with said crests about said stack, and a cylindrical hollow aluminum stator casing centrifugally cast about said stack so as to have its inner surface, when molten, penetrated by and thus, when solidified, rigidly connected to the outermost portions of said crests and of said teeth.

2. A stator according to claim 1, further comprising an outer, substantially cylindrical steel jacket for said stator casing, said jacket having its inner surface covered by said aluminum casing when the latter is in molten condition, and being rigidly connected to the outer surface of said casing when the latter is solidified.

3. A stator according to claim 2, said jacket extending only partly along the length of said casing, and said casing being provided in a portion thereof spaced from said jacket with a plurality of longitudinally extending openings.

4. A stator for electrical machines of the rotor-stator type, comprising a plurality of substantially square metallic laminae assembled in face to face relation and angularly staggered with respect to one another to form a stack having a plurality of crests constituted by the corners of said laminae and extending longitudinally of said stack and spaced from one another substantially peripherally of said stack, a pair of pressure rings contacting the remote faces of the outermost laminae of said stack for holding all said laminae together, and a hollow stator casing centrifugally cast about said stack so as to have its inner surface, when molten, penetrated by and thus, when solidified, rigidly connected to the outermost portions of said crests and the outermost portions of said pressure rings.

5. A stator according to claim 4, each of said pressure rings being provided with a plurality of circumferentially spaced, substantially radial, outwardly extending projections equal in number to said crests of said stack, said pressure rings being so positioned at said remote faces of said outermost laminae as to ensure that said projections are, respectively, in substantial alignment with said crests of said stack, the outermost end portions of said projections constituting said outermost portions of said pressure rings penetrating said inner surface of said centrifugally cast casing when the latter is molten, and being rigidly connected to said centrifugally cast casing when the latter is solidified.

6. A stator according to claim 5, said pressure rings each being provided with annular centering means extending away from said stack to form mounting locations for bearing shields subsequently to be mounted at opposite ends of said casing.

7. A stator according to claim 4, further comprising a cylindrical reinforcing jacket for said casing, said jacket having its inner surface covered by said centrifugally cast casing when the latter is molten, and being rigidly affixed to the outer surface of said centrifugally cast casing when the latter is solidified, whereby said centrifugally cast casing constitutes the only connection between said jacket and said stack of laminae.

8. A stator according to claim 4, said centrifugally cast casing being provided with a plurality of substantially longitudinally extending openings providing access to the interior of said casing about said stack of laminae.

9. A stator according to claim 4, said centrifugally cast casing being provided with a plurality of substantially radial bores, said stator further comprising foot means for supporting said casing and provided with a plurality of apertures aligned with said bores in said casing, and fastening means extending through said bores and the respective aligned apertures and fixedly connecting said foot means directly to said stack of laminae.

10. A stator according to claim 9, each of said corners of said laminae being provided with at least one perforation to establish a plurality of cooling ducts through the respective crests of said stack, said fastening means extending into said perforations of some of said corners.

References Cited in the file of this patent

UNITED STATES PATENTS

| | | |
|---|---|---|
| 1,759,415 | Perlesz | May 20, 1930 |
| 1,919,557 | Johnson | July 25, 1933 |
| 2,508,207 | Woll | May 16, 1950 |

FOREIGN PATENTS

| | | |
|---|---|---|
| 137,089 | Great Britain | Dec. 22, 1919 |
| 181,867 | Great Britain | June 29, 1922 |
| 300,257 | Great Britain | Aug. 21, 1928 |
| 366,492 | Great Britain | Jan. 29, 1932 |
| 495,387 | Belgium | Aug. 16, 1950 |
| 650,140 | Germany | Sept. 11, 1937 |
| 703,574 | Germany | Mar. 12, 1941 |
| 727,615 | France | Mar. 29, 1932 |